(12) United States Patent
Stanke et al.

(10) Patent No.: US 8,495,824 B2
(45) Date of Patent: Jul. 30, 2013

(54) DISTRIBUTOR PLATE FOR FLUIDIZED BED EQUIPMENT

(75) Inventors: Klaus Stanke, Baienfurt (DE); Paul Kröhl, Ravensburg (DE)

(73) Assignee: Andritz Technology and Asset Management GmbH, Graz (AT)

( * ) Notice: Subject to any disclaimer, the term of this patent is extended or adjusted under 35 U.S.C. 154(b) by 125 days.

(21) Appl. No.: 12/931,786

(22) Filed: Feb. 10, 2011

(65) Prior Publication Data
US 2011/0197467 A1 Aug. 18, 2011

(30) Foreign Application Priority Data
Feb. 12, 2010 (AT) .................................. A 207/2010

(51) Int. Cl.
*F26B 17/00* (2006.01)
(52) U.S. Cl.
USPC ............................................... 34/582; 34/654
(58) Field of Classification Search
USPC ..................................... 34/582, 654
See application file for complete search history.

(56) References Cited

U.S. PATENT DOCUMENTS

| 4,257,171 | A | * | 3/1981 | Johnson et al. ................. 34/582 |
| 4,521,378 | A | * | 6/1985 | Ichimura et al. .............. 422/135 |
| 4,589,841 | A | * | 5/1986 | Bergkvist ...................... 431/170 |
| 4,715,996 | A | * | 12/1987 | Lambousy et al. ......... 261/114.2 |
| 4,748,916 | A | * | 6/1988 | Nordh ......................... 110/182.5 |
| 5,627,243 | A | * | 5/1997 | H am al ainen et al. ......... 526/68 |
| 5,753,191 | A | * | 5/1998 | Yamamoto et al. .......... 422/143 |
| 2005/0163682 | A1 | * | 7/2005 | Jacobs et al. .................. 422/228 |
| 2005/0169822 | A1 | * | 8/2005 | Kao et al. ...................... 422/231 |
| 2005/0244311 | A1 | * | 11/2005 | Kao et al. ...................... 422/187 |
| 2008/0299291 | A1 | * | 12/2008 | Weidhaus et al. ................ 427/8 |

* cited by examiner

*Primary Examiner* — Kenneth Rinehart
*Assistant Examiner* — Jason Lau
(74) *Attorney, Agent, or Firm* — Alix, Yale & Ristas, LLP

(57) ABSTRACT

The invention refers to a distributor plate (12) for fluidized bed equipment (9) with openings (3) and deflector strips (1) arranged directly above them. It is characterised by the deflection strips (1) having an oblong shape, being mounted longitudinally in the fluidized bed equipment (9), in parallel to the main flow direction (19) of the product above the openings (3) in the base plate (2), and having spacers (6) that form an outflow cross-section around the periphery of the deflection strip (1) for the fluidizing gas, where the base plate openings (3) can be designed advantageously with an oblong cross-section. This ensures good fluidization of the material, while also conveying it.

23 Claims, 5 Drawing Sheets

DISTRIBUTOR PLATE FOR FLUIDIZED BED EQUIPMENT

BACKGROUND OF THE INVENTION

The invention relates to a distributor plate for fluidized bed equipment with openings and deflector strips arranged directly above them.

Bulk materials are treated (dried, cooled, tempered, ...) in fluidized bed equipment. The material to be treated enters the equipment, is fluidized and then conveyed in a statistical distribution to the overflow. The underflow is used to empty out and discharge the coarse material. Fluidization is effected by the gas conveyed into the air boxes by a fan, and which flows evenly through the distributor plate into the product layer. The gas leaves the equipment through the dedusting unit, sucked in by a fan.

In order to ensure even distribution of the gas volume flow into the fluidized bed equipment, distribution plates of different designs are used. The distribution plates combine one or more functions to enable stable equipment operation.

These include:
  Even distribution of the gas flow over the surface, also with different counter-pressures in places in the fluidized bed as a result of bubbles forming, secondary air currents, etc.
  Separation of air chamber (air box) and product layer, especially to prevent the product from trickling through into the air chamber.
  Avoidance of dead surfaces with no gas flowing through because the product would collect here and could suffer from thermal damage and inadequate product exchange in the fluidized bed.
  Conveying of particles that cannot be fluidized adequately due to their size and descend onto the distributor plate.

Even gas distribution is achieved by the distributor plate having an adequate pressure drop in relation to the pressure fluctuations occurring in the product layer. Ideally, this is achieved by accelerating the flow with as little loss as possible, i.e. by converting the pressure energy into kinetic energy as completely as possible so that there is a maximum transfer of impulse to the particles (CH 629394).

In practice, pressure losses of 50-300 daPa are used frequently because they form a good compromise between operational reliability and energy requirement.

This means that the distributor plates used have a free cross-section with air flowing through typically measuring 0.5-15% of the total surface area.

This is achieved by means of sieve, sintered, perforated, or punched plates whose free cross-section is distributed finely over the entire surface, or by means of nozzle plates, where the free cross-section is concentrated in a few nozzles.

During operation, the product should not trickle through if the pressure loss is dimensioned correctly and the openings are not too big. During shutdown, however, this must be guaranteed by the geometry, for example very small holes (depending on the particle diameter, but frequently<approx. 0.2 mm in perforated, sieve and punched plates), which tend, however, to cause clogging in circulating gas operation, or by covering (larger than the bulk material cone) the openings with discs, strips, and so on (cf. EP 0103708, CH 629394). Self-closing nozzles are also known, from column technology for example (gas-liquid fluidized bed).

During operations, however, the product settles on these coverings because the surfaces are on the slipstream side. This is prevented by mounting displacement bodies on these surfaces (cf. EP 0215327, EP 0103708). As a result, greater effort is required and, if the strips are mounted at right angles to the main conveying direction of the product, there will be additional resistance when conveying coarse material.

There are solutions for conveying inadequately fluidized coarse material that have been implemented technically. Conveying can be assisted mechanically on the one hand by causing the entire fluidized bed equipment to vibrate or only the air boxes or distributor plates. In order to avoid this considerable design effort and other disadvantages, a pneumatic conveying effect is achieved with an appropriate distributor plate design.

In stamped metal plates, asymmetrical tools create a hole that is open on one side which allows the gas to flow forwards and upwards on a slant, thus effecting an impulse transfer to the particles parallel to the distributor plate (brand names include Conidur, Coniperf).
  In nozzle plates with rotationally symmetrical gaps, the gas generally flows parallel to the base plate anyway, but in all directions. By closing off at least half of the gap by means of a suitable shim, it is possible to set any desired outflow direction, and thus also conveying direction.
  In nozzle plates with covered cross-direction gaps, the conveying direction is dictated by the arrangement of the gaps. Conveying is obstructed, however, by the cover strips arranged in cross direction.

The state-of-the-art distributor plates have disadvantages, however, that are avoided by using the embodiment according to the invention:
  Due to manufacturing reasons, punched bases only have small sheet thicknesses and are thus sensitive to wear and extreme temperatures, which limits their possible applications.
  The impulse of the gas flow exiting at high speed is dispelled by the fluidized bed after only a few centimetres; a large number of closely distributed nozzles are needed in order to continue conveying, and this means additional effort and more obstacles.
  nozzle plates with gaps in cross direction tend to form deposits on the cover strips, and it is not possible to mount displacement bodies without further obstructing conveying operations.

BRIEF SUMMARY OF THE INVENTION

The aim of the invention is thus to create a distribution plate that also conveys the coarse material in addition to achieving good mixing and turbulence.

According to the invention, this is achieved by the deflection strips having an oblong shape, being mounted longitudinally in the fluidized bed equipment, in parallel to the main flow direction of the product above the openings in the base plate, and having spacers that form an outflow cross-section around the periphery of the deflection strip for the fluidizing gas, where the base plate openings can be designed advantageously with an oblong cross-section. These measures ensure good fluidization of the coarse material, while also providing good conveying properties in this material.

An advantageous development of the invention is characterised by the spacers being formed as guide plates. This allows targeting conveying of the product flow.

A favourable embodiment of the invention is characterised by the spacers shaped as guide plates applying a flow direction to the fluidizing gas that is parallel to the base plate and has one component in the main flow direction of the product. This can be used for targeted control of product treatment, e.g. drying, cooling, and so on.

An advantageous development of the invention is characterised by the guide plates forming an angle (α), where it is an advantage if the angle (α) is an acute angle, for example between 30° and 90°. In this way, the conveying extent can be set conveniently.

It has proved particularly favourable if a pressure loss by the base plate with the air flowing through is set at 40-500 daPa by means of the height of the spacers. As a result, a particularly good compromise can be achieved between operating reliability and energy requirement.

Advantageously the spacers are formed as separate intermediate pieces with guide plates forming channels, which should make it easy to adjust the desired pressure loss and the volume of gas flowing through by changing the channel height.

A favourable embodiment of the invention is characterised by the deflection strips being designed in a prism shape, where the prisms can be triangular and mounted with the tip pointing upwards, with the point angle advantageously between 10° and 130°, for example between 50° and 70°. As a result of the prism shape, any deposits of material on the deflection strips is practically prevented, thus substantially prolonging the operating time of the fluidizing bed equipment.

The prism-shaped deflection strips can be secured to cross bars underneath the base plate. It has proved particularly favourable if the prisms are secured to fixed links formed in the base plate.

An advantageous development of the invention is characterised by the prisms clamping the spacers formed as separate intermediate pieces to the base plate.

BRIEF DESCRIPTION OF THE SEVERAL VIEWS OF THE DRAWINGS

The invention will now be described in examples and referring to the drawings, where.

DETAILED DESCRIPTION OF THE INVENTION

Figure 1:
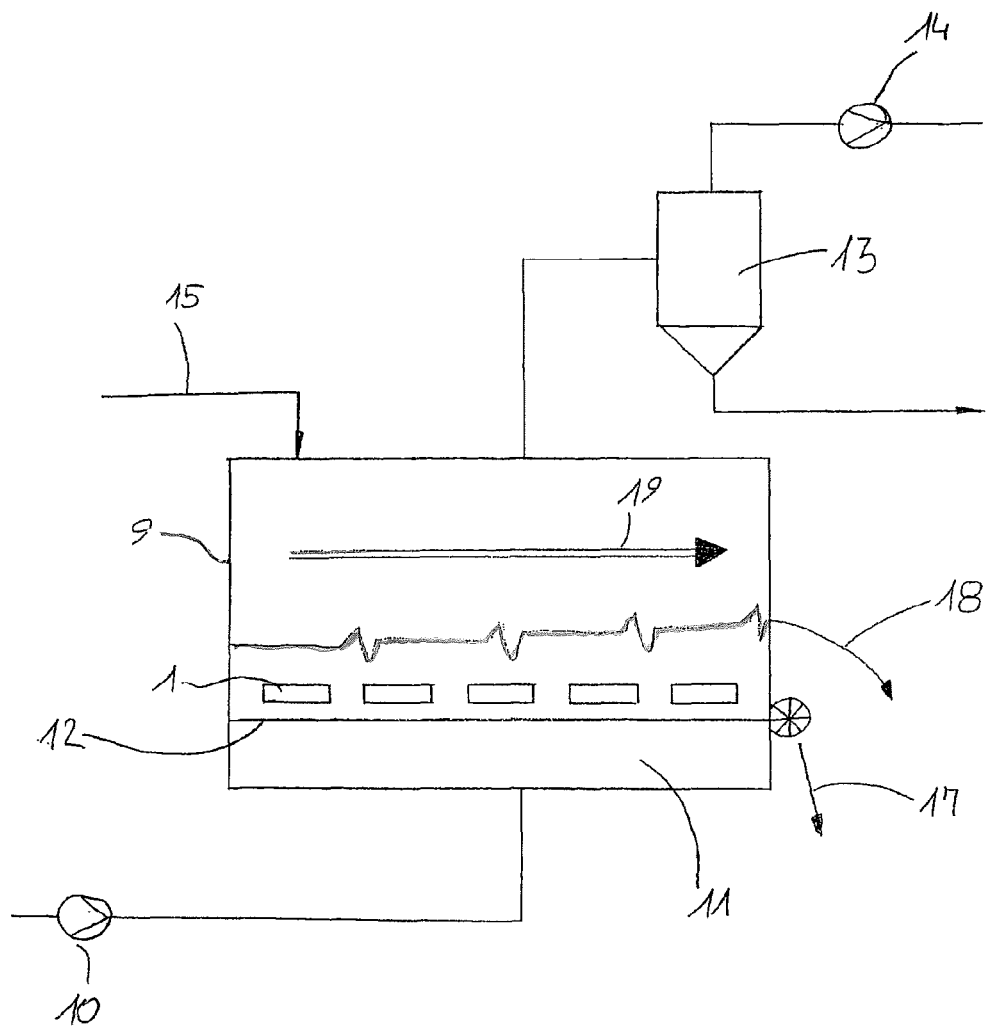
FIG. 1 shows a diagram of a fluidized bed device.

FIG. 1 shows fluidized bed equipment in which bulk material is treated (dried, cooled, tempered, . . . ). The material 15 to be treated enters the fluidizing bed equipment 9, is fluidized, and conveyed in a statistical distribution in product flow direction (arrow 19) to the overflow 18. The underflow 17 is used to empty out and discharge the coarse material. Fluidization is effected by the gas conveyed into the air boxes 11 by the fan 10, and which flows evenly through the distributor plate 12 into the product layer. A number of deflection strips 1 are arranged above the distributor plate 12. The gas leaves the equipment via the dedusting unit 13, sucked in by the fan 14.

Figure 2:
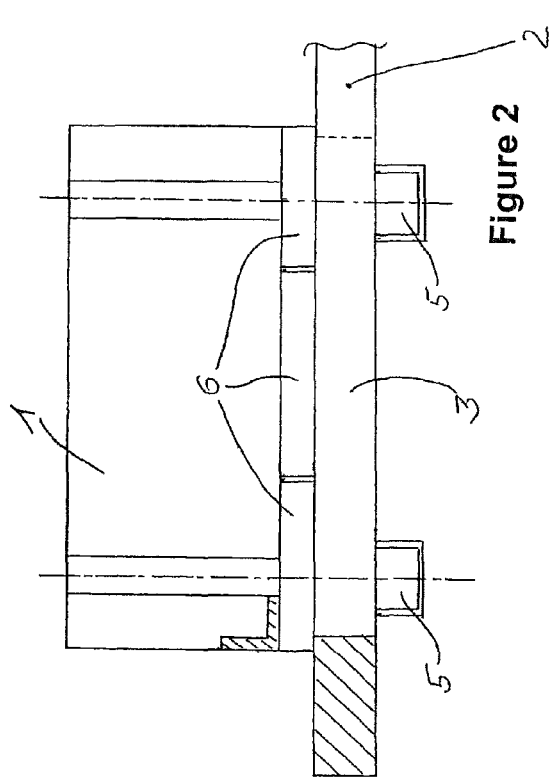
FIG. 2 shows a sectional view of a distributor plate according to the invention, FIG. 3 contains a top view of a distributor plate according to the invention as shown in FIG. 2.

A variant of the distributor plate according to the invention is shown in FIG. 2. It has longitudinally arranged openings (constricting gaps). The gas flow is deflected parallel to the base plate, and the openings 3 in the base plate 2 of the distributor plate 12 are covered by deflection strips 1, which are shown here as hollow triangular prisms.

Figure 3:
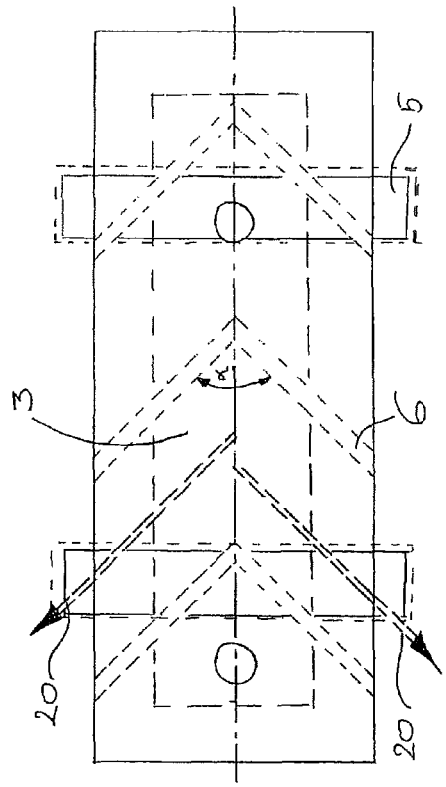

The guide plates 6 shown in the top view in FIG. 3 are arranged above the opening 3 and guide the discharged gas in the direction of the arrows 20. The opening angle α between two guide plates 6 determines the extent of conveying.

Figure 4:
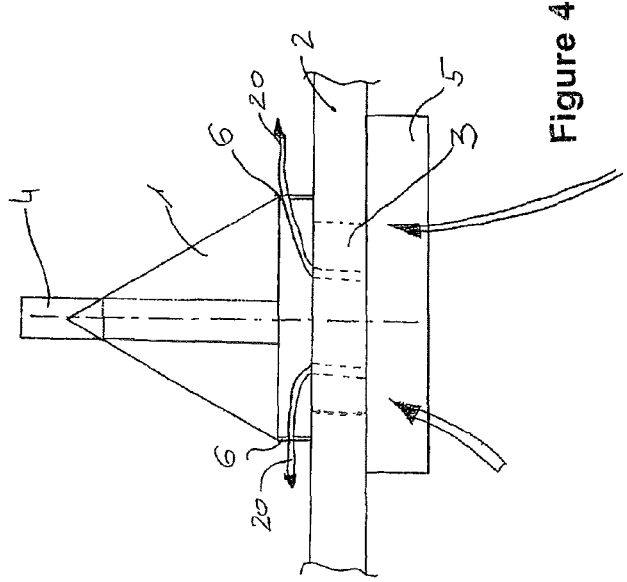
FIG. 4 shows a cross-section of a distributor plate as shown in FIG. 2.

The guide plates 6 can abut one another at the ends or extend only as far as the opening 3 in the base plate 2, where care must be taken to ensure that there is adequate overlap to guarantee reliable deflection of the gas flow. FIG. 4 shows the cross-section through FIG. 2, where the prism shape of the deflection strip 1 can be seen. The prism-shaped deflection strips 1 can be secured to the base plate 2 in many different ways, e.g. by means of bolts inserted into guides 4 and by the deflection strip 1 being braced against the base plate 2 by means of profiles 5 positioned at right angles under the openings 3. This variant is particularly suitable for high-temperature applications in order to absorb stresses. Another possibility is to use fixed links integrated into the base plate 2 instead of the profiles 5 and threaded elements welded to the deflection strips 1 instead of inserting bolts.

The width (length of the base side of the triangle) of the deflection strips 1 is selected such that an area of 20 to 80%, typically around 50%, of the total distributor plate width of the fluidized bed equipment is covered. Advantageously the height is the same or larger than the corresponding bulk material cone in order to avoid deposits. The main effect of this arrangement is, however, that the speed of the gas in the vicinity of the prisms, above the base plate, is much higher than in the other parts of the fluidized bed. This means that the coarse material that has descended into the area between the prisms is still fluidized or at least kept moving. By increasing the prism height further to a multiple of the base side length, this area can be extended in order to also control larger quantities of bulk material.

Figure 5:
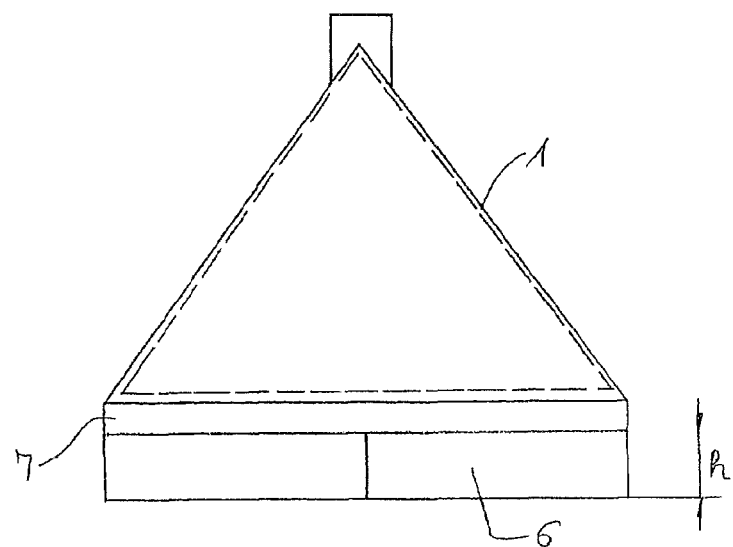
FIG. 5 shows a cross-section of a further variant of a distributor plate according to the invention.
Figure 6:
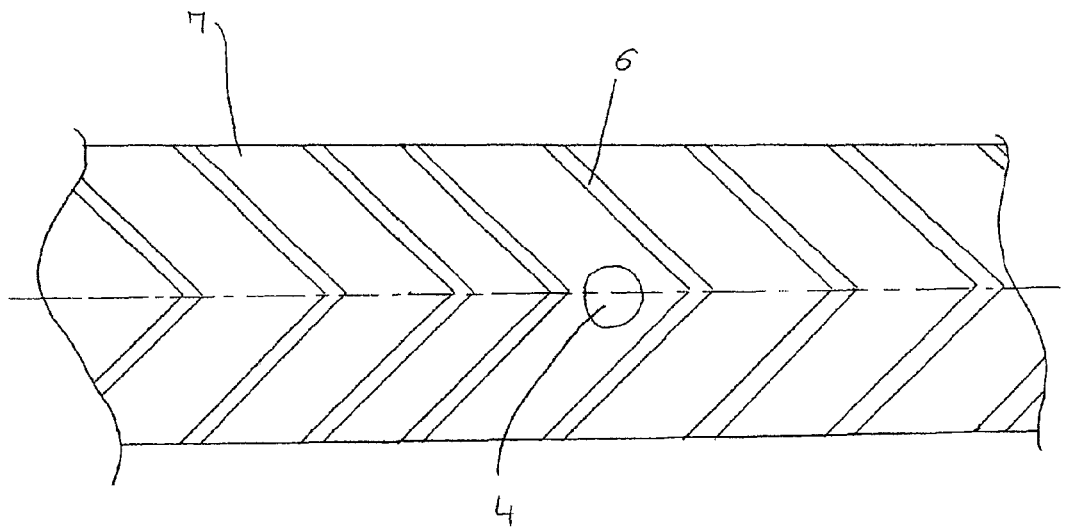
FIG. 6 shows a top view of a distributor plate according to the invention, FIG. 7 contains a top view of an arrangement of a distributor plate according to the invention.

With this arrangement, the requirements that were actually incompatible—low fluidizing speed to minimize dust discharge and high fluidizing speed to also convey the coarse grain portion—are combined to advantage in one fluidized bed. A further variant of the invention is shown in FIGS. 5 and 6 (top view). In order to be able to adjust the pressure loss and gas volumes by modifying the channel height h, it is an advantage if the guide plates 6 are not welded directly to the deflection strips 1, but arranged on supporting plates 7 secured detachably to the deflection strips 1.

Figure 7:
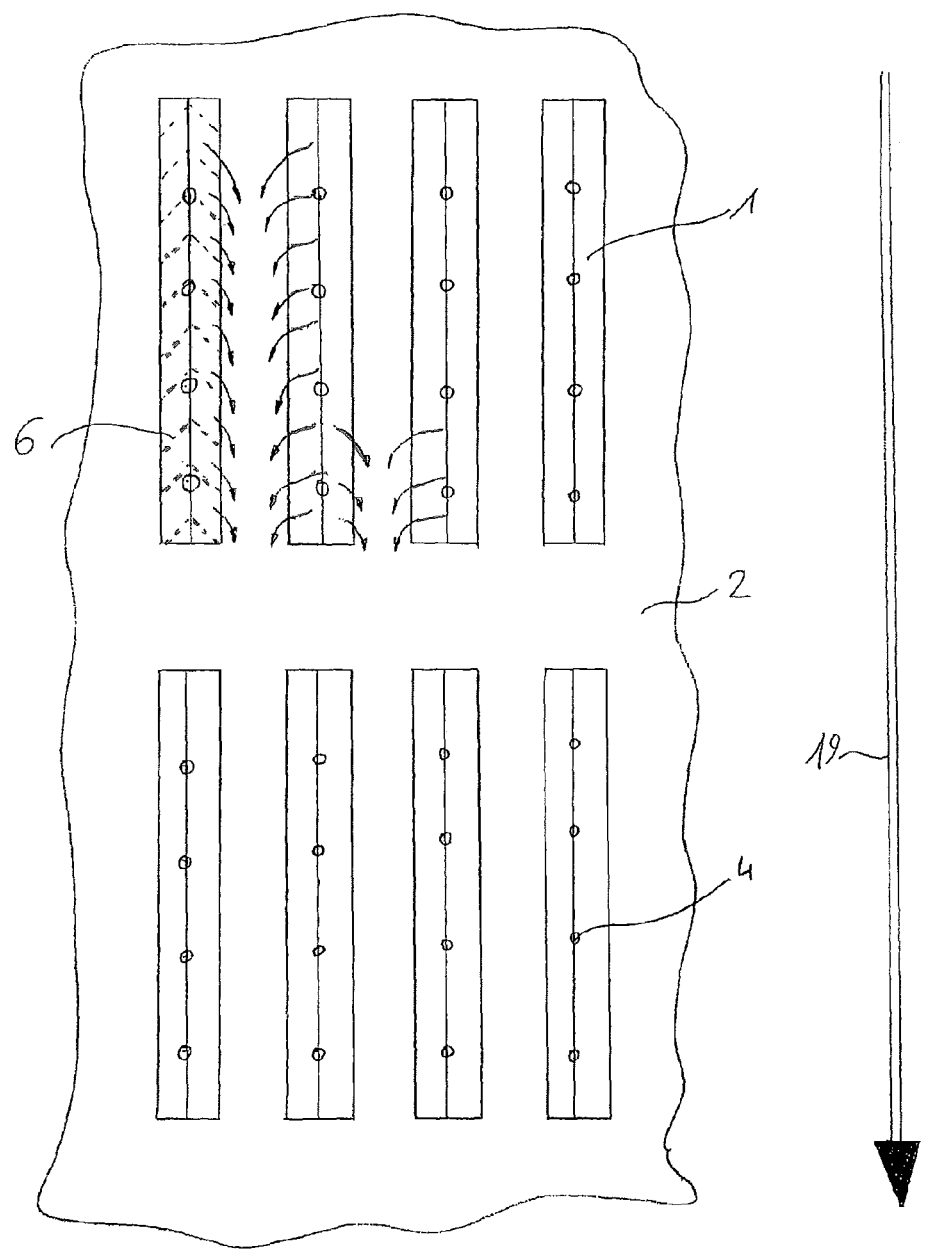

FIG. 7 shows an arrangement of the distributor plate 12 according to the invention, where the conveying properties of the distributor plate are further improved by applying a direction component in longitudinal direction to the constricting gap to the gas exiting in the outflow cross-section. The spaces between adjacent deflection strips 1 form smooth channels on the base plate 2 that run right through the fluidized bed equipment 9 from the product inlet 15 to the product discharge 18 in product flow direction 19. A suitable extractor device, e.g. a rotary valve or conveying screw, at the end of the equipment 9 on the level of the base plate 2 collects and discharges the moving coarse material. Subsequent conveying of the coarse material located further forward is assisted by the gas flow components in channel direction. The flow direction of the gas is dictated by guide plates 6 in the constricting gap.

Figure 8:
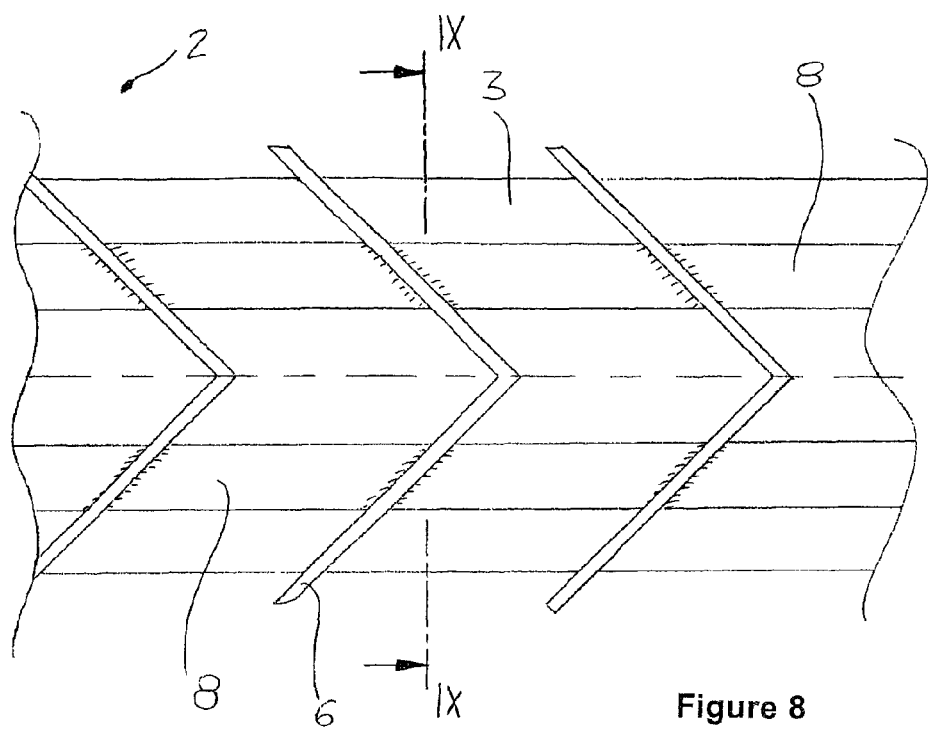
FIG. 8 shows a top view of a further variant of a distributor plate according to the invention, and FIG. 9 contains a sectional view of a distributor plate according to FIG. 8 along the line marked IX-IX.
Figure 9:
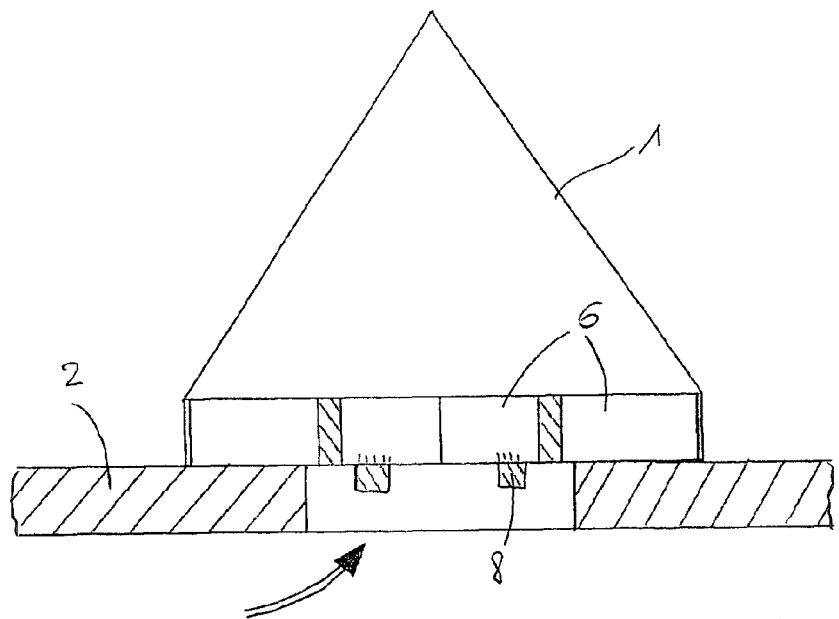

FIG. 8 shows another means of securing the guide plates. The guide plates 6 are secured here to carrier strips 8 and this framework is clamped between base plate 2 and deflection strip 1. FIG. 9 shows a sectional view of this embodiment along the line marked IX-IX in FIG. 8.

The invention claimed is:

1. A distributor plate for fluidized bed equipment comprising: a base plate with a flat upper surface and elongated in a main flow direction of intended travel of fluidized material; a plurality of openings in the base plate; deflection strips, having an oblong shape and extending longitudinally in said main flow direction above the openings in the base plate; and spacers that form flow paths from the openings to an outflow cross section around the periphery of the deflection strip for fluidized gas.

2. The distributor plate according to claim 1, wherein the spacers are formed as guide plates.

3. The distributor plate according to claim 1, wherein the spacers are shaped as guide plates applying a flow direction to the fluidized gas that is parallel to the upper surface of the base plate and has one component in the main flow direction of the material.

4. The distributor plate according to claim 2, wherein pairs of the guide plates each form an acute angle.

5. The distributor plate according to claim 1, wherein a pressure drop of the fluidized gas through the base plate opening to the outflow is in the range of 40-500 daPa.

6. The distributor plate according to claim 2, wherein the spaced apart guide plates form straight channels at the upper surface of the base plate.

7. The distributor plate according to claim 1, wherein the deflection strips have a prism shape.

8. The distributor plate according to claim 7, wherein the prism shaped deflection strips are secured to fixed links formed in the base plate.

9. The distributor plate according to claim 7, wherein the deflection strips are secured to cross bars underneath the base plate.

10. The distributor plate according to claim 7, wherein the deflection strips clamp the spacers.

11. The distributor plate according to claim 4, wherein the acute angle is in the range of between about 30° and 90°.

12. The distributor plate according to claim 7, wherein the prism is triangular and mounted with an apex pointing vertically relative to the surface of the base plate.

13. The distributor plate according to claim 12, wherein the angle of the triangle at the apex is between about 50° and 70°.

14. The distributor plate of claim 10, wherein the spacers are formed as spaced apart guide plates.

15. The distributor plate of claim 1, wherein the base plate openings are oblong in the main flow direction.

16. The distributor plate of claim 15, wherein the spacers are shaped as guide plates applying a flow direction to the fluidizing gas that is parallel to the upper surface of the base plate and has one component in the main flow direction of the material, each of said guide plates extending perpendicularly from the upper surface of the base plate and with a plurality of guide plates spaced apart over a single oblong opening.

17. The distributor plate according to claim 16, wherein pairs of the guide plates each form an acute angle.

18. The distributor plate of claim 17, wherein the deflection strips have a triangular shape with an apex pointing vertically relative to the upper surface of the base plate.

19. The distributor plate according to claim 16, wherein the guide plates are mounted to support bars in the openings.

20. The distributor plate according to claim 17, wherein the guide plates are mounted to support bars in the openings.

21. The distributor plate according to claim 1, wherein each deflection strip has a solid lower surface spaced above an opening and a periphery over a portion of the base plate surrounding said opening, and the spacers are solid plates that extend parallel to the base plate above the opening and a portion of the base plate surrounding the opening, with a height that extends from the base plate to said lower surface of the deflection strip.

22. The distributor plate according to claim 21, wherein the spacers form distinct flow channels between the upper surface of the base plate surrounding the opening and said lower surface, in a flow direction that is parallel to the upper surface of the base plate.

23. The distributor plate according to claim 22, wherein pairs of the spacers each form an acute angle that opens in the main flow direction.

* * * * *